(12) United States Patent
Motomura

(10) Patent No.: US 7,100,538 B2
(45) Date of Patent: Sep. 5, 2006

(54) PET WASHING AND DRYING APPARATUS

(76) Inventor: Hisashi Motomura, 1-18-706 Hie-machi, Hakata-ku, Fukuoka (JP)

( * ) Notice: Subject to any disclaimer, the term of this patent is extended or adjusted under 35 U.S.C. 154(b) by 0 days.

(21) Appl. No.: 11/070,052

(22) Filed: Mar. 2, 2005

(65) Prior Publication Data
US 2005/0217602 A1 Oct. 6, 2005

(30) Foreign Application Priority Data
Mar. 30, 2004 (JP) ............... 2004-100821

(51) Int. Cl.
*A01K 13/00* (2006.01)
(52) U.S. Cl. .............. 119/671; 119/668; 119/604; 119/606
(58) Field of Classification Search ........... 119/665, 119/668, 671, 673, 603, 604, 606
See application file for complete search history.

(56) References Cited

U.S. PATENT DOCUMENTS

| 3,884,191 A | 5/1975 | Stout |
| 4,549,502 A | 10/1985 | Namdari |
| 4,730,576 A | 3/1988 | Yoshikawa |
| 5,448,966 A | 9/1995 | McKinnon |
| 5,724,918 A * | 3/1998 | Navalon-Chicote ......... 119/668 |
| 6,688,257 B1 * | 2/2004 | Lee ............................ 119/671 |

FOREIGN PATENT DOCUMENTS

| JP | 1994-46705 | 2/1994 |
| JP | 1995-274758 | 10/1995 |
| JP | 1996-117 | 1/1996 |
| JP | 1996-205704 | 8/1996 |
| JP | 2003-47357 | 2/2003 |

* cited by examiner

*Primary Examiner*—T. Nguyen
(74) *Attorney, Agent, or Firm*—Trojan Law Office

(57) ABSTRACT

A pet washing and drying apparatus which can wash and dry a pet simply in a short period of time, and with a simplified structure to reduce costs.

4 Claims, 4 Drawing Sheets

PET WASHING AND DRYING APPARATUS

CLAIM OF PRIORITY

This application claims foreign priority to Japanese Patent Application No. 2004-100821 filed on Mar. 30, 2004.

BACKGROUND OF THE INVENTION

1. Field of the Invention

The field of this invention relates to a pet animal washing and drying apparatus. In particular, the invention is concerned with an enclosed apparatus to automatically wash and dry a pet, such as a dog or cat.

2. Background

In order to maintain the health of a pet, such as a dog or cat, a certain level of exercise is fundamentally required, and daily walks should be performed and are indispensable. These walks, however, are often postponed because the dog would get dirty if it was let outside, especially on rainy days. One of the main reasons for this is that washing of the dog is time-consuming as it can take as much as two hours to wash and then dry the dog using a hair dryer and a brush, not to mention the difficulties required in restraining the dog. Pet owners may not want to waste this amount of time, and, therefore, they avoid taking the dog out for a walk. However, if the dog is not exercised sufficiently, stress might accumulate, causing the pet to be irritable or ill.

Many different forms and shapes of pet washing devices are known. Generally, a pet washing device is constructed in such a way as to be a fixed length for the width of the washing and drying area that holds the blower and nozzle attachment. Due to the variety among the anatomy of pets, however, it is difficult to completely wash and dry the pet, especially on the side of the neck or on the stomach of the animal. Normally, as the drying process ends after a given period, it is common to see dogs emerging after the period with fur that is still wet. A truly effective and encompassing pet washing device has not been developed.

Thus, a need exists for a pet washing device to perform a thorough and complete washing and drying in a short period of time.

SUMMARY OF THE INVENTION

This invention satisfies the need for a pet washing and drying apparatus which can wash and dry pets simply in a short period of time, and which can reduce costs through a simplification of the device.

In order to satisfy this need, the first structure of the present invention is provided with a floor plate which has a hot air discharge part and a shower discharge part in the washing and drying area within a sealed-type body; a horizontal blower and nozzle attachment shelf which has a similar hot air discharge part and shower discharge part; and a roof part with a shower discharge part, a shampoo and conditioner discharge part, and an intake port; wherein it is possible to move said blower and nozzle attachment shelf as desired in the vertical direction.

In this first structure, when washing the pet, it is possible to discharge the warm water from the floor plate side towards the top, or from the left or right side in an approximately horizontal direction, or even from the top part towards the bottom, making it possible to wash the entire body of the pet.

At this time, the shower from the right and left sides can be moved vertically within a given vertical range to match the size of the pet. Through this vertical movement of the shower from the left and right sides, it is possible to effectively wash the pet by ensuring that a shower of the appropriate strength is applied to the entire surface of the pet. Also, it is possible to discharge air at the same time as performing the shower, allowing for improved washing efficacy, especially for long-haired dogs. Next, using shampoo, dirt and fleas are washed off the animal, and then, using conditioner, hair damage is prevented.

Once the washing operation is complete, a drying operation will be performed by discharging warm air with the blower from either the left or right side, or from the top or bottom side. The horizontal blower from either the left or right side can be moved vertically as warm air is blown onto the sides of the pet ensuring a complete drying operation. As the humidity is discharged from the discharge port on the top part, the drying operation will be fast within the cleaning and washing area. In this way, it is possible to perform pet washing and drying with high efficacy and in a short period of time.

The second structure of the present invention is one wherein the horizontal movement frame, which holds the blower and nozzle attachment shelf, can be moved closer to or farther away from the shelf.

Through this second structure, it is possible to perform discharge of the washing water and of the warm air from a distance which is as close to the pet as possible through adjustment of the spacing of the blower and nozzle attachment shelf to match the size of the pet.

The third structure of the present invention is one wherein the opening part on the inner side of said movement frame is covered by a curtain which can be raised along with said blower and nozzle attachment shelf.

Through this third structure, it is possible to protect the pet from the danger of entering and being trapped inside the opening part of the movement frame.

According to the present invention, it is possible to construct a space which matches the size of the animal, in particular, a dog, and by moving the discharge ports of the shower and the warm air on the side surfaces vertically, it is possible to apply a shower and warm water flow of the appropriate strength to the dog, making it possible to wash and dry the animal in a short period of time. Also, by moving the discharge ports for the shower and the warm air closer in accordance to the size of the dog, it is possible to wash and dry the animal in close proximity, and in particular, by using a strong warm air flow to blow off any water, it is possible to increase the speed of the drying operation.

DESCRIPTION OF THE DRAWINGS

FIG. 1(*b*) is a partial front view showing the door of the embodiment of the invention.

DETAILED DESCRIPTION

Figure 1A:
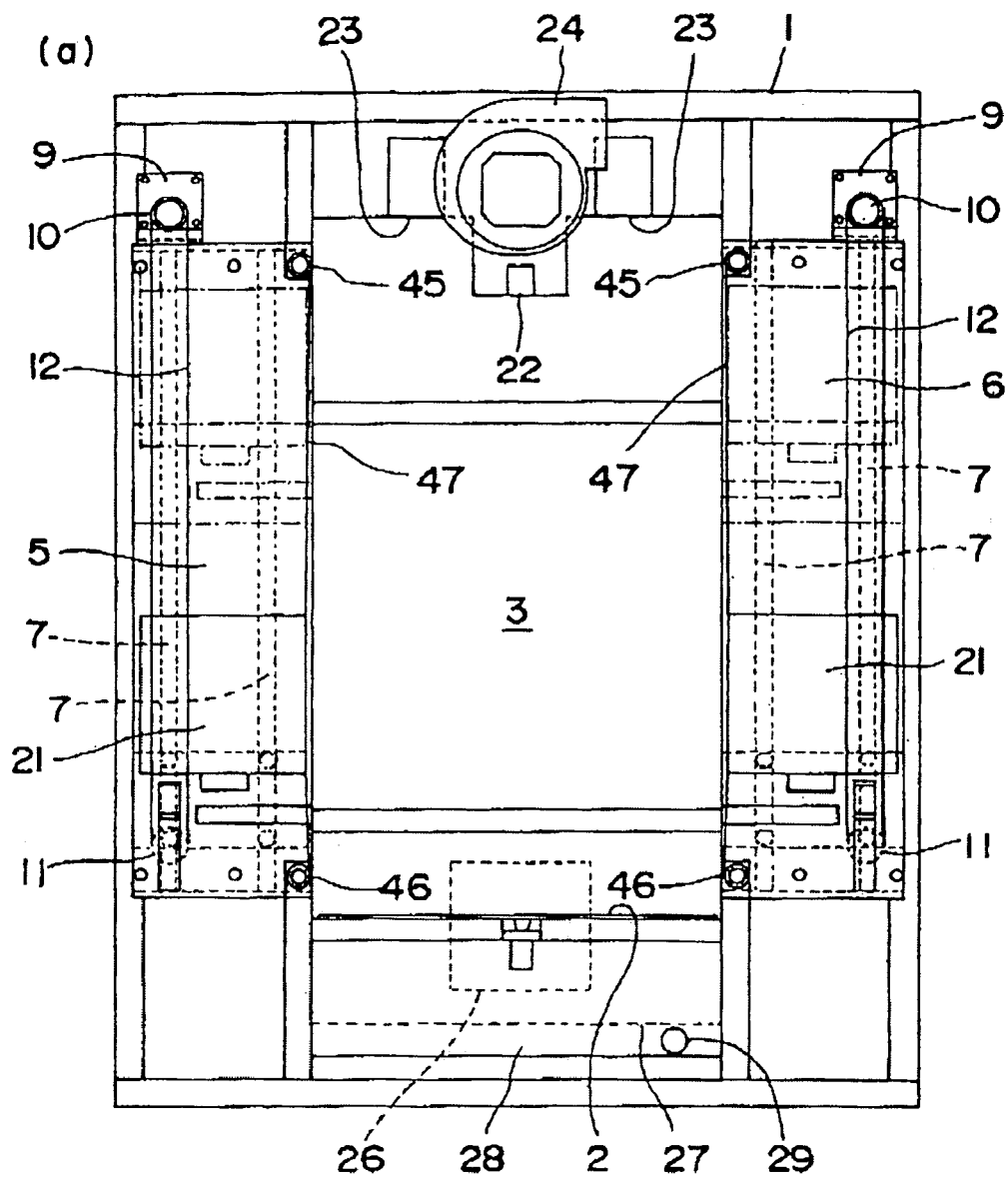
FIG. 1(*a*) is a front view which omits the door of the pet washing and drying apparatus according to the present embodiment.
Figure 1B:
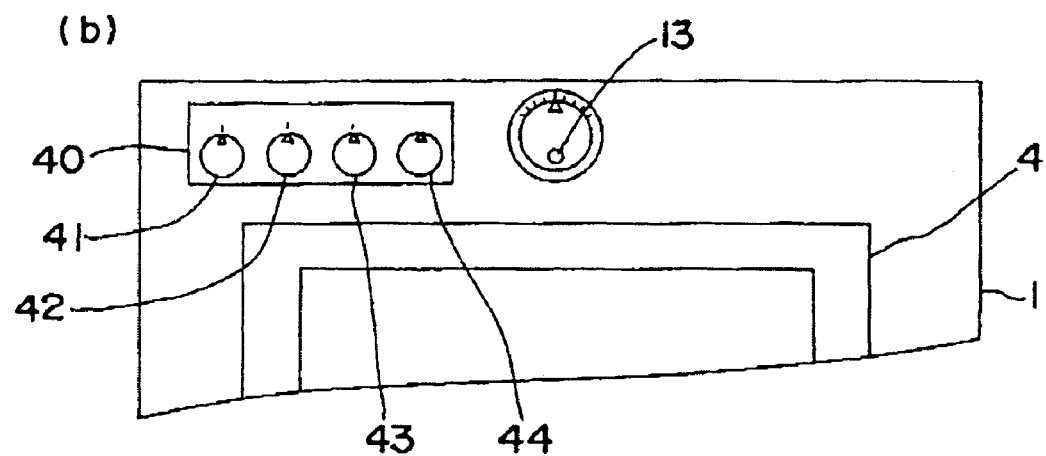

In the following description of the preferred embodiments, reference is made to the accompanying drawing figures, which form the part thereof, and in which are shown by way of illustration of specific embodiments in which the invention may be practiced. It is to be understood that other embodiments may be utilized and structural and functional changes may be made without departing from the scope of the present invention.

On the inside of the sealed-type body 1, which is formed of a rust-resistant material such as stainless steel or plastic, there is a floor plate 2 made of a grating that forms the washing and drying area 3. On the front surface of this body 1, there is a door 4 with reinforced transparent glass, which can be opened, closed, and locked. There are also sensors (not shown in the figure) to detect when the door 4 is opened or closed. On the right and left side of the washing and drying area 3 inside the body 1, there are movement frames 5 and 6. On each of these movement frames 5 and 6, there are perpendicular guide rails 7, and a blower and nozzle attachment shelf 8, which can be freely raised through these perpendicular guide rails 7.

On the blower and nozzle attachment shelf 8 attached to the movement frames 5 and 6, nozzles 20 are secured for emitting liquid and discharging the shower and blowers 21 are secured for drying and discharging the warm air. Said movement frames 5 and 6 are capable of movement in a horizontal direction relative to the floor plate 2 in order to move closer to and farther away from the animal.

The blower and nozzle attachment shelf 8 is attached in one location to the timing belt 12 which bridges the space between the drive pinion 10 of the raising hoisting motor 9 which is set on the top part of the movement frames 5 and 6 and the passive pinion 11 which is set on the bottom part of the movement frames 5 and 6, and can be raised.

On the top part of the body 1, there is a handle 13, and by rotating this handle 13, it is possible to rotate the handle axis 14, whose rotation is then transmitted via the directional conversion gear 15 to the screw rods 16 and 17, making it possible to adjust the width of the washing and drying area 3 by moving each of the movement frames 5 and 6 either outwards or inwards using the nuts 18 and 19 which are attached to the top part of the movement frames 5 and 6.

The amount of movement of the movement frames 5 and 6 due to the rotation of the handle 14 can also be displayed around the handle 13 of the body 1. Further, this handle mechanism can also be constructed to be driven using a motor, rather than by hand.

The opening surface of the side of the washing and drying area 3 of the movement frames 5 and 6 are covered by a curtain 47 which is wrapped around the curtain roll reels 45 and 46 on the top and bottom, making it possible to move the edge of the curtain 47 up or down along with the movement of the blower and nozzle attachment shelf 8.

On the roof part of the washing and drying area 3, there is a shower nozzle 22 and an intake port 23. The intake port 23 is connected to the intake fan 24, which discharges the humidity within the washing and drying area 3.

Also, on the lower part of the floor plate 2, there is a duct 25 in order to discharge the warm air from the entire surface of the floor plate 2, a blower 26, and a shower discharge port (not shown in the figure). Further, on the lower part of the floor plate 2, there is a discharge water pan 27, a filter 28, and a discharge water drain pipe 29. The filter 28 is used to filter the hair of the animal, and is set such that it can be removed from the outside and cleaned.

Figure 2:
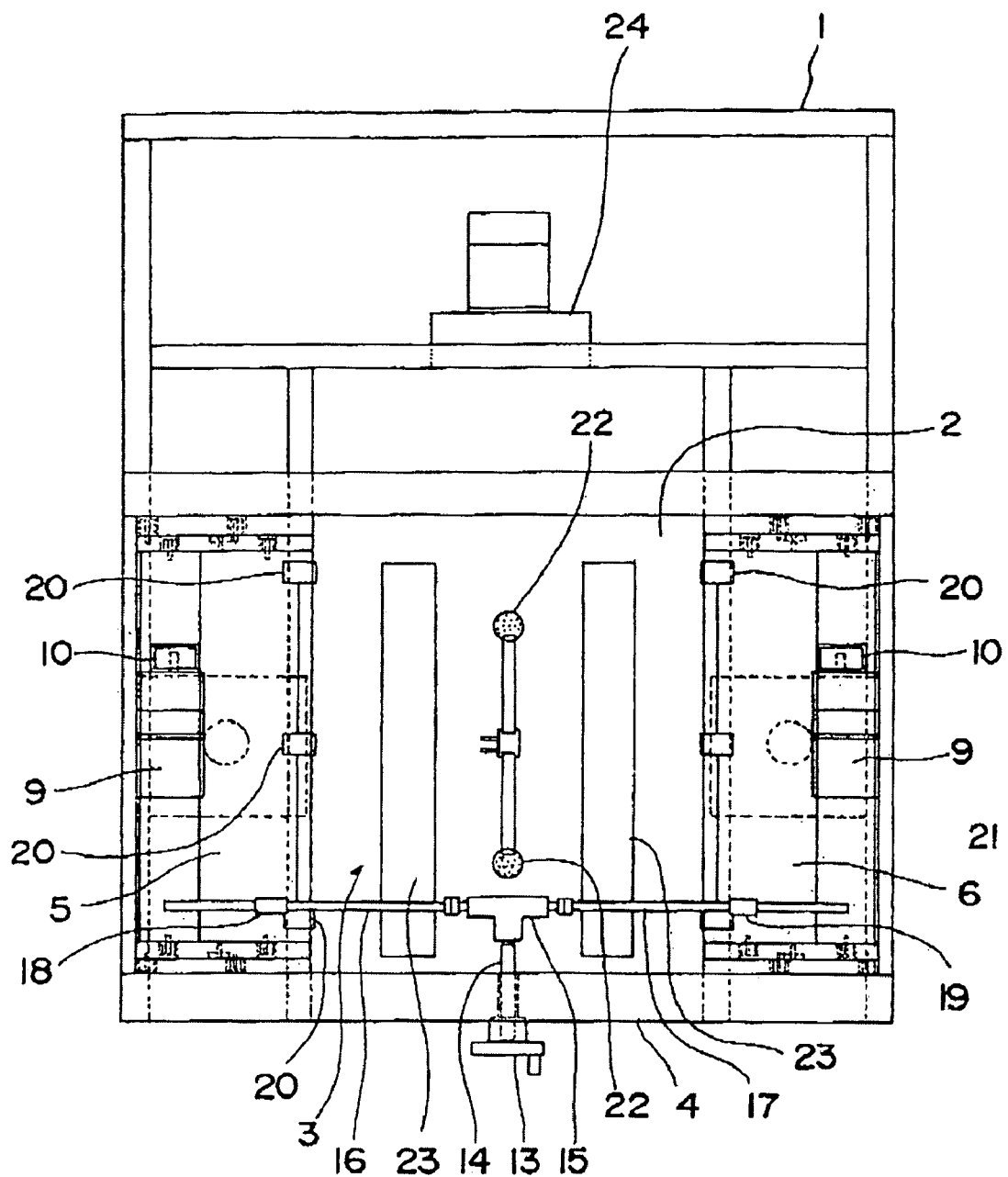
FIG. 2 is a cross sectional diagram with a side view of the embodiment of the invention.
Figure 3:
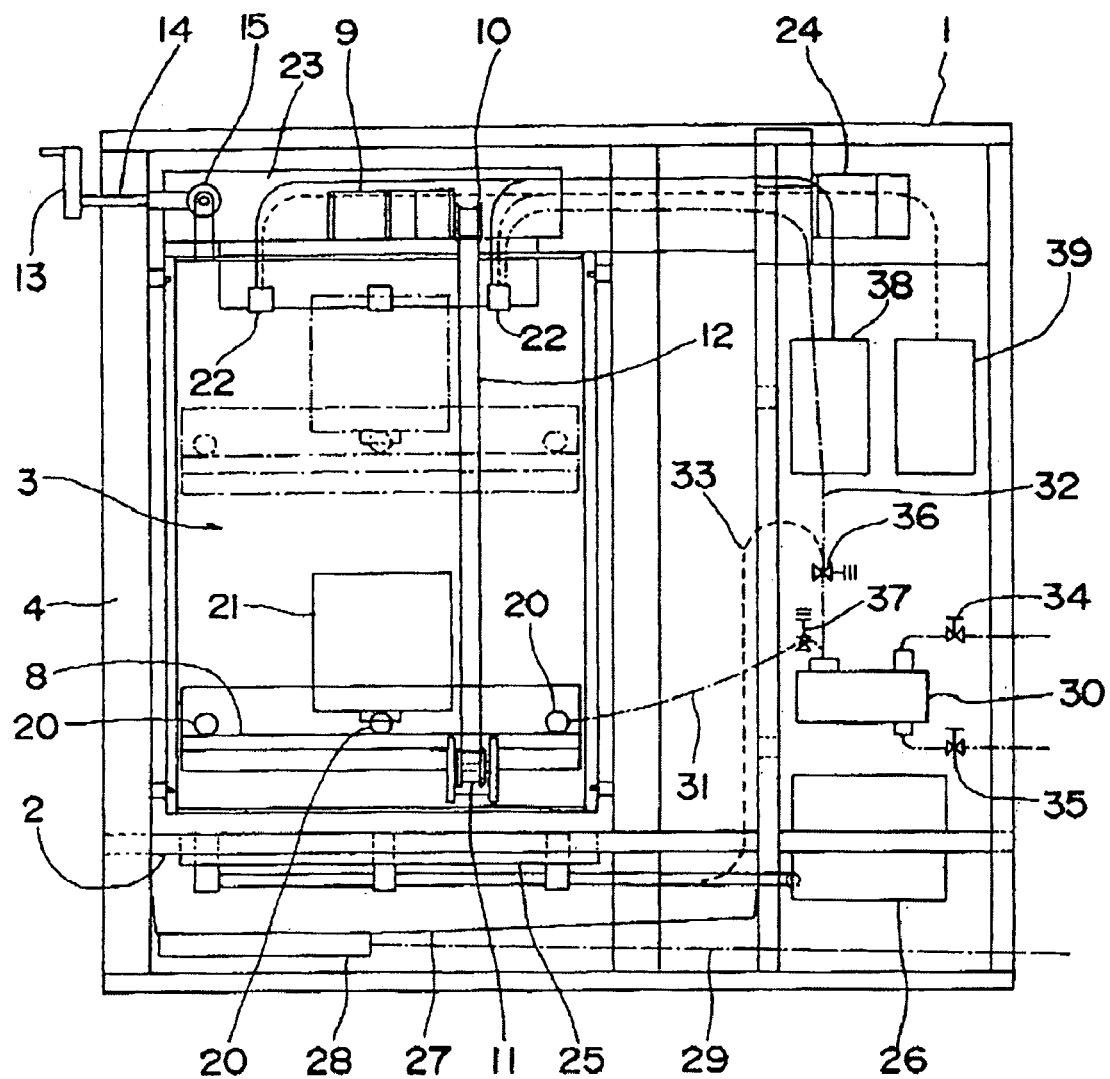
FIG. 3 is a top plain view of the embodiment of the invention.

On the back part of the body 1, as shown in FIG. 2, there is a warm water mixing apparatus 30 which mixes the warm water from the water tank with the water from the tap. Each are connected via the pipes 31, 32, and 33 to the nozzles 20 of the movement frames 5 and 6 as well as to the shower nozzle 22 on the ceiling and the shower discharge port on the floor plate (not shown in the figure). Control of the tap water amount and of the water tank amount as well as opening and closing of the valves are performed through remote control (automatic control) using the flow adjustment valves 34, 35, 36 and 37. On the shower nozzle 22 on the top part, it is possible to discharge the shampoo from the shampoo tank 38 and conditioner from the conditioner tank 39 at the desired timing from the respective pumps.

On the upper surface of the body 1, there is an operation part 40, consisting of a start/stop button 41, a warm air discharge time adjustment knob 42, a shower temperature adjustment know 43, and a shower time adjustment knob 44.

A typical embodiment of the present apparatus is on the scale of height 1240 mm, width 860 mm, and depth 1150 mm, and the breadth of the washing and drying area 3 are on the scale of height 760 mm, width 440 mm, and depth 760 mm. The width of the washing and drying area 3 can be adjusted using the handle 13 from 300 mm to 440 mm, making it possible to adjust it according to the size of the pet.

Operation of the pet washing and drying apparatus is described below:

1. Plug in the power switch (not shown in the figure).
2. Perform adjustment of the water tank water flow amount.
3. Perform adjustment of the warm water flow amount.
4. Using the handle 13, adjust the protrusion distance in the horizontal direction of the movement frames 5 and 6; in other words, adjust the width of the washing and drying area 3 according to the size of the pet.
5. Using the vertical movement width control sequencer, set the vertical movement range of the blower 21.
6. Using the shower time set knob 44, set the duration for the shower. For instance, set the appropriate shower duration between 5 and 15 minutes.
7. Using the shower temperature set knob 43, adjust the shower temperature.
8. Using the warm air discharge time set knob 42, adjust the warm air temperature.
9. The liquid levels of the shampoo tank 38 and of the conditioner tank 39 are observed, and if the level falls below a certain level, a refill warning will be shown. The above settings are recorded for each pet, so when using the apparatus for the same pet, or for the same type of pet, it is possible to perform setup easily by calling up the recorded details.
10. The door 4 is opened, the pet is placed inside, the door 4 is closed, and the start/stop button 41 on the operation part 40 is pressed. At this time, it is only possible to operate the device when the door 4 has been closed, ensuring safety.
11. Washing—Warm water will be discharged from the lower nozzle (not shown in the figure), the upper shower nozzle 22, and from the nozzles 20 on the movement frames 5 and 6. The nozzles 20 of the movement frames 5 and 6 can be raised or lowered by raising or lowering the nozzle attachment shelf 8 within the established vertical range using the hoisting motor 9.
12. Shampoo and Conditioner (Rinse)—Shampoo will be discharged from the shampoo tank 38. During this time, the shower water will continue to be discharged. After a given period of time, conditioner will be discharged from the conditioner tank 39.
13. Rinse—Stopping the discharge of the conditioner, a rinse operation will be performed for a period of time using the shower water.

14. Dry—After completing the rinse operation, warm air will be discharged from the blowers 21 and 26 for a set period of time. The blower 21 can be raised or lowered by raising or lowering the nozzle attachment shelf 8 within the established vertical range using the hoisting motor 9. During this time, by discharging air from the intake port 23, it is possible to increase the speed of the drying operation. After a given drying period, for instance, 15 to 60 minutes, the fan and exhaust will stop.

15. End—When the washing and drying operations are completed, the finished lamp will light up, and the lock on the door 4 will be released.

Many modifications and variations are possible in light of the above teaching. The foregoing is a description of the preferred embodiment of the invention and has been presented for the purpose of illustration and description. It is not intended to be exhaustive and so limit the invention to the precise form disclosed.

The invention is to be determined by the following claims:

What is claimed is:

1. An apparatus for washing and drying an animal comprising:

A sealed body having an apparatus for showering said animal with liquid and a floor plate upon which said animal is encouraged to stand upon during operation;

said showering apparatus including a plurality of blower and nozzle attachment shelves, each said blower and nozzle attachment shelf having nozzles secured for emitting liquid and blowers secured for drying, each said blower and nozzle attachment shelf capable of movement in a horizontal direction relative to said floor plate in order to move closer to and farther away from said animal and in a vertical direction relative to said floor plate in order to move up and down along the height of said animal;

said floor plate including blowers directed upward toward said animal; and, a control mechanism for coordinating the operation of the fluid discharge, blowers, and movement of the components of the showering apparatus.

2. The washing and drying apparatus of claim 1 wherein said body includes a roof portion having at least one shower discharge port and at least one shampoo discharge port.

3. The washing and drying apparatus of claim 1 wherein said body includes a roof portion having at least one shower discharge port, at least one shampoo discharge port connected to a shampoo reservoir, and at least one conditioner discharge port connected to a conditioner reservoir.

4. The washing and drying apparatus of claim 1 wherein said roof portion includes at least one shampoo discharge port connected to an intake port, said intake port connected to a fan.

* * * * *